Sept. 6, 1927.
J. B. HOOD
SCREW LOCKING AND UNLOCKING DEVICE
Filed Jan. 27, 1926
1,641,489
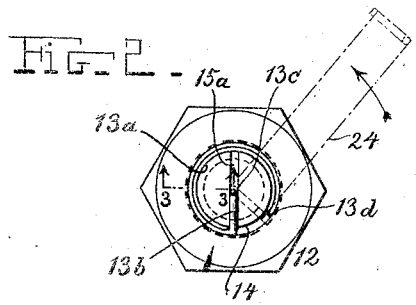
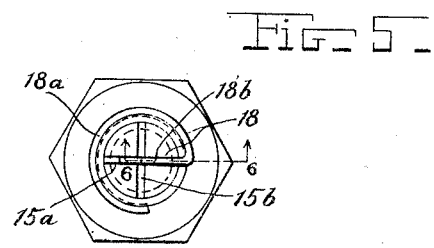
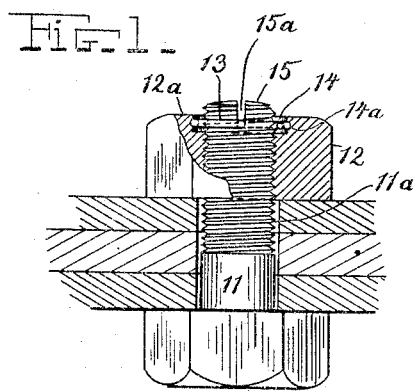
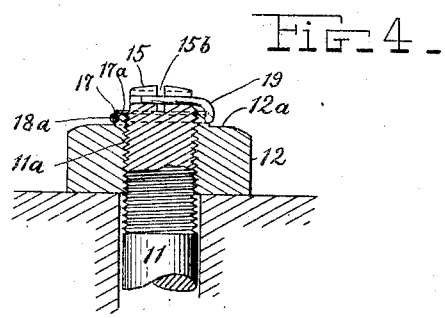
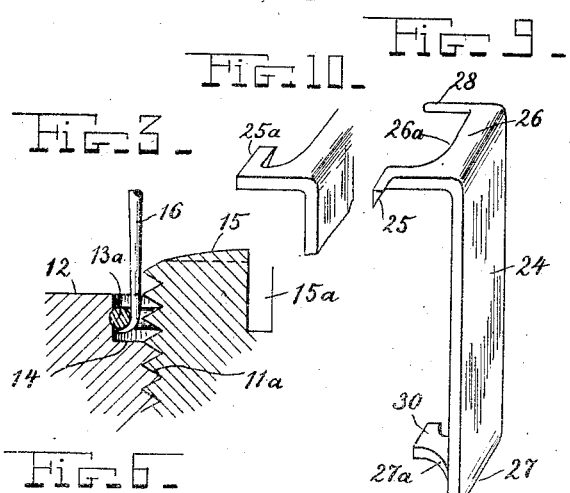
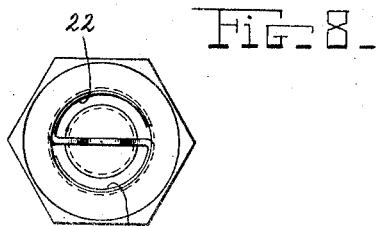
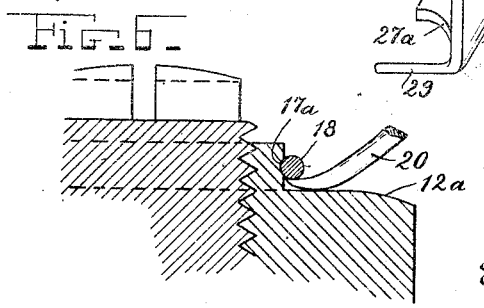
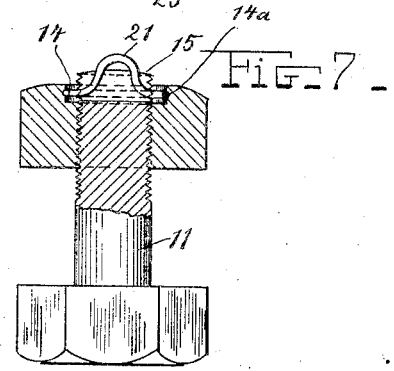
Inventor
*James Bruce Hood*
By his Attorney
*Richard A. Hoffmann*

Patented Sept. 6, 1927.

1,641,489

UNITED STATES PATENT OFFICE.

JAMES BRUCE HOOD, OF FOREST HILLS, NEW YORK.

SCREW LOCKING AND UNLOCKING DEVICE.

Application filed January 27, 1926. Serial No. 84,087.

This invention relates to improvements in screw-locking devices for use in connection with bolts cooperating with a nut, screwed spindles, adjusting screws and similar machine elements. It belongs to a class of locking devices which depend for their operative principle on the application of a coil or spiral spring, forming a full complete turn or not comprising essentially more than a semi-circle of the thread circumference, pivotally engaged at one end with one of the two cooperating machine elements and adapted to frictionally engage the second element with its other or free end.

Illustrative of this class of screw-locking devices are three former devices of the applicant, two of which are covered and described respectively by U. S. Patent 1,324,822 of December 7, 1917 and U. S. Patent 1,542,247, of June 16, 1925 and the third one by British Patent 153,819 of November 18, 1920.

But while in the above cited examples the coil spring is fastened on one end in a recess of the nut, either stationary or pivotally, and engages the screw thread of the bolt with the extant resilient portion, this relation is reversed in the new invention, the coil being supported by the bolt, while the resilient outer portion frictionally engages a rotary portion of the nut, be this the ordinary threaded inside or a specially provided part, recessed from the helical inner surface or even the outside rim of a little protruding collar, integral with the nut, as one of the illustrations of the accompanying drawing shows.

Otherwise the coil, as in all prior cases, is arranged so as to form a continuation of the thread, pointing from its recessed or pivoted end into such a direction that when the bolt unscrews, the backward or unlocking movement of the latter tends to tighten the frictional grip of the outstanding coil upon the opposing surface of the cooperating nut, thereby effectively counteracting any disengaging movement.

It is apparent, that while the corresponding coil spring in applicant's prior devices became subjected to tension in this phase, the coil in the presently illustrated cases is compressed in a circumferential direction, closely hugging with ever increasing friction the opposing surface of the nut. The effect however is analogous, it resists any further retrogressive movement of the bolt.

The modification shown in Fig. 5 however is an exception to this reversal of stress, in that it also owes its locking efficiency to tension, as will be explained later on.

This rearrangement or reversal of the operative parts of the locking mechanism, as above described, has been made use of in prior attempts of other inventors and is therefor not claimed as a basic novelty, but their applications apparently are lacking in one respect: the facility of unlocking the devices of this special sort in an easy and instantaneous manner without breaking at least one of the component parts or damaging the threaded surface of the engaging element. While therefor:

The first object of the invention is the production of an improved locking device applicable to and forming an operative part of the threaded bolt or screw which will automatically lock said bolt in the cooperating nut against any disengaging movement.

The second and main object is to afford facilities for subsequent unlocking of this device in an easy and instantaneous manner without injuring the locking parts or mutilating the threads.

A third object is to arrange the effective parts of the locking device in such manner as to make them easily accessible for the initial locking operation as well as for any subsequent unlocking.

A fourth object is to afford such facilities for locking and unlocking that the use of very simple instruments, as the tool, illustrated in the drawing and especially contrived and adapted for this purpose or even any emergency tool, being at hand, like a curved hook, a screw driver or a pocket knife, may be found expedient.

A fifth object is to effect said improvements and added facilities of the described class of screw locking devices at a minimum cost of production and labor, yet retaining the maximum of reliable efficiency, inherent in similar devices, based on the same or similar principles, but lacking the special features to be presently described.

These objects are attained by the devices described herewith and illustrated in the accompanying drawing, in which Figure 1 is an elevation, partly sectional, of a bolt and nut, provided with the improved screw-locking device and indicating the work piece, which for example may be the web of a rail together with an adjacent fishplate on either side, in section.

Figure 2 is the top view of this bolt and nut, showing the arrangement of the device, when locked.

Figure 3 is a detail on an enlarged scale showing the arrangement of the locking spring in the recess of the nut, when viewed in section along the line 3—3 of Figure 2, and indicating the manner in which said locking spring may be unlocked by the application of a simple emergency tool.

Figure 4 shows a sectional elevation of a modified form of the locking device, showing similar facilities for unlocking the same.

Figure 5 is a top view of this device, when locked.

Figure 6 is a detail on an enlarged scale, illustrating in a similar way as Figure 3 the arrangement of the locking spring in relation to the nut, when viewed in section along the line 6—6 of Figure 5 and indicating a simple manner of unlocking the spring.

Figure 7 is an elevation, partly sectional of another modified arrangement of the locking device, following the same principles but having an additional feature which, while facilitating the eventual unlocking also increases the efficiency of the locking mechanism.

Figure 8 is a top view of the device shown in the preceding figure, but also illustrating more clearly a variation of the locking spring from the forms shown before.

Figure 9 is a perspective view of a tool, especially designed, for releasing the locking spring, as shown in Figure 1 and 2, or fastening it in place.

Figure 10 illustrates a modification of this tool, if applied to the locking device, shown in Figures 4 and 5.

Similar numerals refer to similar parts throughout several views.

In Figure 1 the numeral 11 designates the bolt upon which the nut 12 is threaded. The locking spring 13 consists of the curved portion 13$^a$, comprising a little less than a full turn, concentric with the thread of the bolt and imbedded in the annular recess 14 of the nut 12, and the inwardly bent straight portion 13$^b$, positioned in an open diagonal slot 15$^a$ of the bolt end 15.

The recess 14 of the nut may be a smooth annular depression of the top surface of the nut, just deep enough to receive the curved part of the locking spring, or it may in addition be provided with an annular side groove 14$^a$, running along its inner cylindrical wall, as indicated in Figure 1. This groove affords a secure seat for the locking spring, increases the contact friction with the nut and prevents accidental dislocation or jumping out of the resilient part of the locking wire 13.

This wire does not necessarily form a fixed or integral part of the bolt 11, but may be inserted into the slot 15$^a$, after the nut is properly adjusted. The curved portion can then be easily forced into place. The arrangement and the direction of the free end of the extant spring permits a sliding fit between the wire and the nut, when the latter is subsequently still more tightened, but if the nut or the bolt starts to unscrew, the coil begins to wedge its end 13$^c$ into the groove 14$^a$ and presses all along its outer circumference into said groove with ever increasing stress.

While thus a spontaneous loosening of the nut is effectively prevented, the accessibility of the spring from the outside permits an easy removal or unlocking of the same, as Figure 3 illustrates.

A hook-shaped tool or awl 16, for instance, may be inserted between the threaded surface 11$^a$ of the bolt and the coil 13$^a$, imbedded in the recess 14 of the nut 12, and the coil be forced out of locking engagement.

Instead of imbedding the curved portion of the spring in a depression or recess on the upper surface 12$^a$ of the nut, this surface may be depressed itself, leaving a projecting inner rim or border 17, Figure 4, concentric with the thread 11$^a$, on whose periphery may be provided a groove 17$^a$, similar to 14$^a$ in Figure 1, for the support of and frictional engagement with the locking spring 18.

It is to be observed that in this case the circular part 18$^a$ of the spring has to be of an inside diameter, slightly smaller than the outside diameter of the border 17, so as to clamp the same tightly with compressive force, while in the arrangement, illustrated in Figures 1 and 2, the corresponding coil 13 should have an outside diameter slightly greater than the diameter of the groove 14$^a$, so as to exert an outward pressure upon the inner surface of the same, when it is forced into it. This naturally follows from the conversion of the operative inner surface of the groove into an outer surface 17$^a$ of the border 17.

Furthermore, as the spring in this case engages with an outside surface, instead of an inner surface of the nut, as in all other cases illustrated, and consequently has to exert its frictional locking stress by tension, instead of by compresison, it must be wound around the collar of the nut in an opposite sense to its former direction, to wit: with a right hand thread of the bolt, its extent coil has to point in a counterclockwise direction,—as shown in Fig. 5, while in the former and in all other cases illustrated it runs in a clockwise direction, seen from the engaging end of a right hand thread bolt, and vice versa with a left hand thread bolt. In this respect its function is identical with the function of the locking springs employed in applicant's former patents, alluded to in the preamble.

Instead of having only one slot 15ª cut into the bolt end 15, deep enough to receive the straight portion 18ᵇ of the spring, it may sometimes be advisable to cut an extra slot 15ᵇ, deeper than the first one, at right angles diametrically across the bolt end. This affords the possibility to insert a pin or stiff wire underneath the portion 18ᵇ for dislocating the locking spring if so desired.

Besides this it affords an opportunity to use either a deeper or a shallower groove for imbedding the straight pivotal end 18ᵇ of the spring, according to whether the top of the bolt protrudes more or less beyond the top of the nut.

As the Figure 4 shows, when the nut 12 is tightened on the bolt, the latter has a tendency to uplift the straight portion 18ᵇ in respect to the annular portion on 18ª and additional strain is put on the bend 19 which in turn increases the tension along the extant portion of the spring, increasing thereby the friction with the border of the nut.

As the circular extant portion of the spring is quite exposed and accessible in this arrangement, it is an easy operation to remove or dislocate the same from the border of the nut as Figure 6 indicates.

By a tool 20, similar to the hook 16 in Figure 3 or even by a simple screw driver, the spring 18 may be lifted out of the groove 17ª, using the top surface 12ª of the nut as a lever fulcrum.

Figures 7 and 8 illustrate a further optional improvement of the locking device to facilitate the removal or unlocking of the spring.

It consists in adding a loop 21 to the diametrically arranged portion of the locking spring. This loop has to protrude far enough above the end 15 of the bolt 11 to permit the passage of a rod or stiff wire by which the spring may forcibly be lifted up and thereby withdrawn from the recess 14 which is shown similar to that illustrated in Figure 1.

The spring is so dimensioned and designed that the loop, when not lifted up, will, by expansion, press the spring outwardly into the grooved portion 14ª of the recess 14.

Furthermore, instead of having one single turn, the coil is provided with two semicircular turns 22 and 23, extending in opposite directions from the pivoted middle part, so that the whole spring is shaped in the form of an S.

Although the locking device, as proposed, is of such design and accessibility that it may be unlocked by any suitable emergency tool or improvised contrivance, it is generally more expedient to provide a special tool or key for the unlocking, as well as for the locking operation. This key may of course be shaped in different forms, but a cheap and preferred form of it is shown in Figure 9, while a modification of the key-bit, viz. the efficient part of the key during the unlocking operation, is illustrated in Figure 10. This key can be stamped out and bent into shape, at a trifling cost apiece, from sheet steel, the only finishing operation necessary being the grinding off to a wedge blade of the unlocking bit 25. As will be seen, the main body consists of a narrow strip or flat bar 24, having a short rectangular bend at either end, 26 and 27 respectively. The greater part of material of these two bent-over ends is cut away (see 26ª and 27ª), so as to leave two arches standing. Two of the sideposts of these arches, positioned diagonally opposite to each other, 28 and 29, have a thin square section or may even be rounded off, as the drawing suggests. The other two sideposts have an outstanding leg, 25 or 30, for which provision must be made in the flattened out stamp form of the key. The outstanding leg 25 forms the unlocking bit and, as said before, is ground to a wedge in the manner shown.

The width of the bar 24, as required, will be evident from the application of the key, indicated in dot and dash lines in Figure 2. As will be seen, the straight portion of the locking wire, 13ᵇ, leaves the center of the bolt groove 15ª free, and here the thin end post 28 of the key is inserted, using it as a fulcrum, to turn the key in a counter-clockwise direction. The outstanding leg 25 has to wedge in underneath the extreme end 13ᵈ of the circular portion of the locking spring so as to lift it up and out of engagement with the groove 14ª (Figure 1), when the key is given a rotating motion. To clear the coil spring 13ª then, the width of the key bar 24 must be a trifle less than the inner radius of this coil, while the total width over the bar and keybit must not exceed the radius of the nut recess 14. The bar must be long enough to form a forceful lever.

The other end of the key with the bit 30 is used in an analogous manner for the locking operation, that is, for the forcing down of the locking spring into place, after proper adjustment of the bolt. The movement, necessary for this, is in the opposite direction, the bit is not used as a lifting wedge, but as a depressing latch rather, and as it passes over the spring wire instead of underneath it, this difference must be taken into account by differences in length regarding the fulcrum post 29, viz., the latter must be made a trifle longer than the bit end 30, as the drawing clearly shows.

It is apparent, that a similar special key, adapted to unlock the device, illustrated in Figures 4 and 5, must be modified in one particular detail, in so far as the locking spring in this device does not expand against the outer wall of a groove, but contracts against an inner wall or border 17. Consequently the key bit is not inserted from the inside of the coil spring, but from the outside, and therefor it presents a form, as shown by the bit 25ᵃ in Figure 10. The width of the bar 24 is made correspondingly broader for the same size of bolt. Otherwise the shape and function of the key is identical with that shown in Figure 9.

Different variations of the locking and unlocking features of the devices shown may be made without deviating from the spirit and general principles of the invention.

Having thus described my alleged invention, what I desire to claim as novel and protect by Letters Patent is:

1. A thread-locking and unlocking device, comprising a threaded bolt provided with a diametrical groove across its engaging end, a threaded nut, fitted to engage with said bolt and provided with a circular depression, on the surface destined to be accessible after engagement with the bolt, said depression to have a circular surface, concentric with and of larger diameter than the bolt, and a detachable locking element, having a straight portion, adapted to be seated in the groove of the bolt, and a resilient curved portion, adapted to fit the depressed part of the nut, so as to tangentially engage the circular surface of said depression and thereby to restrain any unscrewing movement of said bolt.

2. A thread-locking and unlocking device, comprising a threaded bolt, provided with a diametrical groove across its engaging ends, a threaded nut, fitted to engage with said bolt and provided with a cylindrical offset, on the surface destined to be accessible after engagement with the bolt, and a detachable locking element, having a straight portion, adapted to be seated in the groove of the bolt, and a concentric circular portion, adapted to resiliently engage the cylindrical offset of the nut and thereby to restrain any unscrewing movement of said bolt.

3. The combination with a threaded bolt, provided with a diametrical groove across its engaging end, and a threaded nut, fitted to engage with said bolt and formed with a concentric recess on its top surface; of a detachable screw-locking and unlocking element, comprising a wire having a supporting portion, seated in the diametrical groove of said bolt a resilient segmental coil end, protruding from said groove in the direction of the thread and adapted to exert a braking effect upon the concentric surface of the recess on the nut, when the bolt is turned in the direction of the protruding coil end, and means connected with the locking element, to facilitate the insertion of a detaching tool, used as a lever to force the locking wire from its engaging position.

In testimony whereof, I have signed my name to this specification this twenty-third day of January, 1926.

JAMES B. HOOD.